(12) United States Patent
Baldwin et al.

(10) Patent No.: US 10,619,776 B2
(45) Date of Patent: *Apr. 14, 2020

(54) END CONNECTOR FOR HIGH PRESSURE REINFORCED RUBBER HOSE

(71) Applicant: Geroge Myer Company, Inc., Houston, TX (US)

(72) Inventors: Gardner T. Baldwin, Houston, TX (US); Victor J. DeLeon, Houston, TX (US); Larry M. Sweeney, Houston, TX (US)

(73) Assignee: Captent Inc, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,161

(22) Filed: Jun. 26, 2019

(65) Prior Publication Data

US 2019/0316714 A1 Oct. 17, 2019

Related U.S. Application Data

(63) Continuation of application No. 15/677,689, filed on Aug. 15, 2017, which is a continuation of application
(Continued)

(51) Int. Cl.
*F16L 33/213* (2006.01)
*F16L 33/207* (2006.01)
*F16L 13/14* (2006.01)

(52) U.S. Cl.
CPC ............. *F16L 33/213* (2013.01); *F16L 13/14* (2013.01); *F16L 33/2073* (2013.01)

(58) Field of Classification Search
CPC ...... F16L 33/2073; F16L 33/213; F16L 13/14
(Continued)

(56) References Cited

U.S. PATENT DOCUMENTS

| 2,661,225 A | 12/1953 | Lyon |
| 2,965,395 A | 12/1960 | Schmohl et al. |

(Continued)

FOREIGN PATENT DOCUMENTS

| EP | 0109270 A1 | 5/1984 |
| FR | 2347603 A1 | 11/1977 |

(Continued)

OTHER PUBLICATIONS

"Sanitary Couplers Hose and Fittings for High-Purity and Sanitary Applications", Siant-Gobain Performance Plastics, product catalog, 2003, 48 pgs.

*Primary Examiner* — Zachary T Dragicevich

(57) ABSTRACT

A swage fitted end connector for high pressure large diameter reinforced flexible rubber hose utilizing sine-wave locking of the reinforcement and particularly suited to the petrochemical and drilling industries. Two embodiments of the connector for use with wire reinforced thin internal tube hose are disclosed: one with a diameter of 3-inches and for burst pressures up to 20,000 psi and the other for a diameter of 5-inches and for burst pressures up to 18,000 psi. All of the connectors will withstand the rated burst pressure of the hose without pumping off or leaking thus any hose that utilizes the device will fail before the connector pops off the hose. The connectors are designed to meet or exceed the new API temperature ranges and new API flexible specification levels which became effective in October 2006.

19 Claims, 11 Drawing Sheets

Related U.S. Application Data

No. 14/946,564, filed on Nov. 19, 2015, now Pat. No. 9,816,651, which is a continuation of application No. 13/138,182, filed as application No. PCT/US2010/000520 on Feb. 23, 2010, now Pat. No. 9,212,771.

(60) Provisional application No. 61/208,531, filed on Feb. 25, 2009.

(58) Field of Classification Search
USPC .............................................. 285/256, 286.2
See application file for complete search history.

(56) References Cited

U.S. PATENT DOCUMENTS

| | | |
|---|---|---|
| 3,347,571 A | 10/1967 | New |
| 4,106,526 A | 8/1978 | Szentmihaly |
| 4,212,487 A | 7/1980 | Jones et al. |
| 4,226,446 A | 10/1980 | Burrington |
| 4,330,142 A | 5/1982 | Paini |
| 4,564,223 A | 1/1986 | Burrington |
| 4,664,424 A | 5/1987 | Smith |
| 5,044,671 A | 9/1991 | Chisnell et al. |
| 5,076,615 A | 12/1991 | Sampson |
| 5,165,733 A | 11/1992 | Sampson |
| 5,349,988 A | 9/1994 | Walsh et al. |
| 6,378,914 B1 | 4/2002 | Quaranta |
| 6,505,649 B1 | 1/2003 | Dixon-Roche |
| 7,338,090 B2 | 3/2008 | Baldwin et al. |
| 8,439,405 B2 | 5/2013 | Trujillo et al. |
| 9,212,771 B2 | 12/2015 | Baldwin et al. |
| 2003/0205898 A1 | 11/2003 | Baldwin et al. |
| 2006/0011249 A1 | 1/2006 | Arima et al. |
| 2007/0157443 A1 | 7/2007 | Baldwin et al. |
| 2008/0238090 A1 | 10/2008 | Williams |
| 2011/0068572 A1 | 3/2011 | Nacsa et al. |
| 2011/0272943 A1 | 11/2011 | Baldwin et al. |
| 2014/0291981 A1 | 10/2014 | Baldwin et al. |
| 2015/0176735 A1 | 6/2015 | Baldwin et al. |
| 2016/0076685 A1 | 3/2016 | Baldwin et al. |

FOREIGN PATENT DOCUMENTS

| | | |
|---|---|---|
| GB | 992378 | 5/1965 |
| WO | 2010098833 A1 | 9/2010 |
| WO | 2013019274 A1 | 2/2013 |
| WO | 2013137968 A1 | 9/2013 |

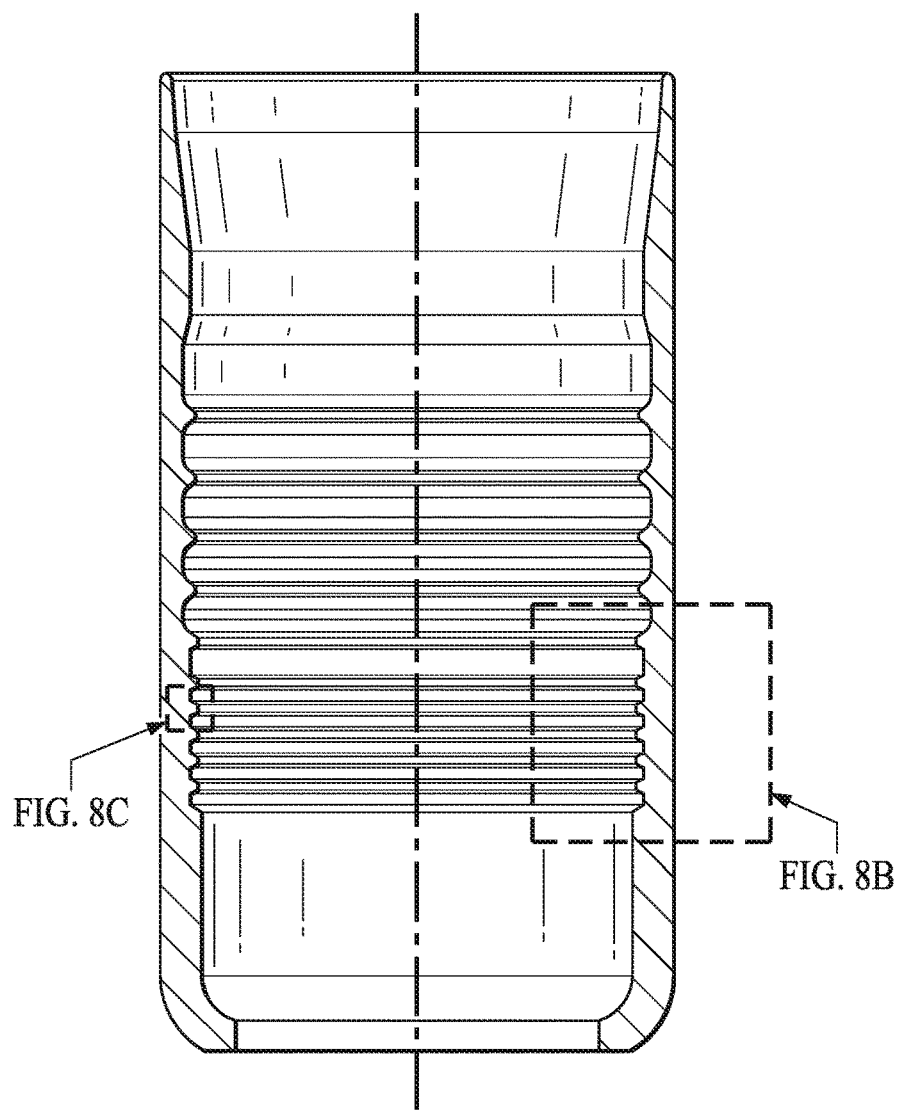
FIG. 8C
FIG. 8B
FIG. 8A
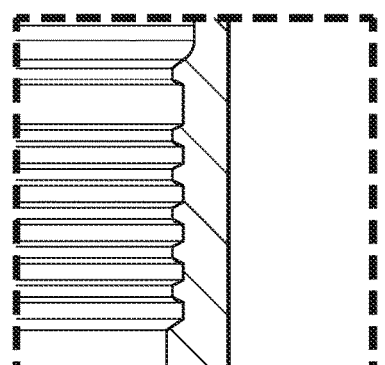
FIG. 8B
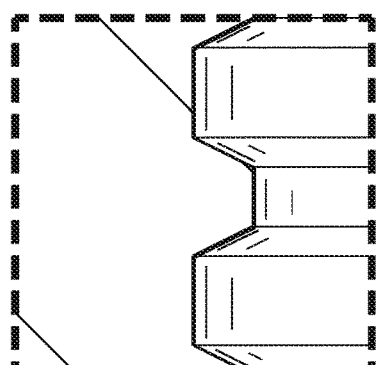
FIG. 8C

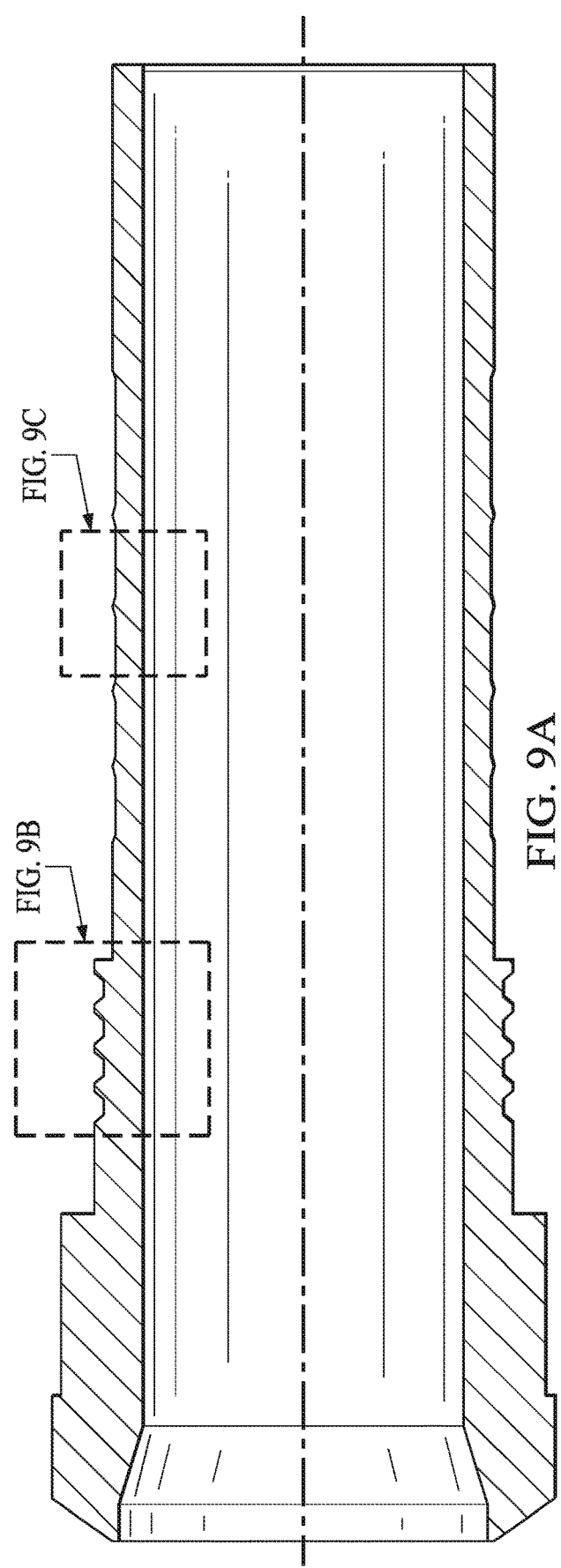
FIG. 9A
FIG. 9C
FIG. 9B

CONNECTOR DIMENSIONS

| HOSE SIZE | STEM SIZE/MATERIAL | FERRULE SIZE/MATERIAL |
|---|---|---|
| 3" - 15K | 4.50⌀ BAR | 7.50 x 6.25 |
| 3½" - 10K | 4.50⌀ BAR | 8.00 x 6.75 |
| 4" - D | 5.56 x 3.30 | 7.25 x 6.00 |
| 4" - E | 5.56 x 3.30 | 8.50 x 7.25 |
| 5" - D | 6.63 x 4.30 | 8.50 x 7.25 |
| 5" - E | 6.63 x 4.30 | 9.00 x 7.50 |

BRITISH UNITS

FIG. 14

SKIVE

| HOSE SIZE/TYPE | O.D. | I.D. | PLY |
|---|---|---|---|
| 3" - 15K CEMENT | 5.89 | 3.76 | 4 |
| 3½" 10K - 16c | 6.39 | 4.26 | 4 |
| 4" - D | 5.72 | 4.76 | 2 |
| 4" - E 10K - 16c | 6.89 | 4.76 | 4 |
| 5" - D | 6.72 | 5.76 | 2 |
| 5" - E | 7.04 | 5.58 | 4-6* |

*VARIES WITH HOSE TYPE

BRITISH UNITS

FIG. 15

END CONNECTOR FOR HIGH PRESSURE REINFORCED RUBBER HOSE

This application is a continuation of U.S. patent application Ser. No. 15/677,689, entitled "END CONNECTOR FOR HIGH PRESSURE REINFORCED RUBBER HOSE," filed on Aug. 15, 2017, which is a continuation of U.S. patent application Ser. No. 14/946,564, entitled "END CONNECTOR FOR HIGH PRESSURE REINFORCED RUBBER HOSE," filed on Nov. 19, 2015, now U.S. Pat. No. 9,816,651 issued Nov. 14, 2017, which is a continuation of U.S. patent application Ser. No. 13/138,182, entitled "CONNECTOR FOR HIGH PRESSURE REINFORCED RUBBER HOSE", filed Jul. 15, 2011, now U.S. Pat. No. 9,212,771 issued Dec. 15, 2015, which is a U.S. National Stage filing of International Application No. PCT/US2010/000520 filed Feb. 23, 2010, under 35 USC 371 entitled "IMPROVED END CONNECTOR FOR HIGH PRESSURE REINFORCED RUBBER HOSE" published on Sep. 2, 2010, as International Publication No. WO 2010/098833, which claims priority of U.S. Provisional Application No. 61/208,531 filed Feb. 25, 2009. The above applications are commonly assigned with this application are incorporated herewith in their entirety.

TECHNICAL FIELD OF THE INVENTION

The present invention relates generally to the reinforced rubber hose industry and in particular to swaged hose couplings used to terminate large diameter high pressure flexible reinforced rubber hose used in the energy, marine, petrochemical and like industries which can meet the newer API standards.

BACKGROUND OF THE INVENTION

High-pressure rubber hose is used in many instances in industry but particularly in the mining, construction, energy, marine and petrochemical industries. Flexible rubber hose is used to transfer fluids under various pressures and temperature between two points, one or both of which, may move relative to each other or to another fixed point in space. Piping at the two points is generally metal (or some other form of fixed conduit) and the flexible hose must attach to the piping at both ends. This requires a coupling on each end of the hose.

In the drilling industry, a flexible rubber hose runs between the pump piping system on the rig and the kelly that is coupled to the rotating drill string. The pump system forces drilling fluid down the center of the drill pipe, and back through the wellbore, in order to flush cuttings from the wellbore (plus providing wellbore stability, etc.). In this instance, the flexible hose is subjected to high pressures. The high pressure is required to both transfer drilling fluid into the wellbore and overcome static return head pressures—the deeper the wellbore, the higher the pressure.

The rotary drilling hose is subject to further stress in that it hangs down within the derrick supported at either end by the metal coupling on the hose and the fact that the kelly is moved up and down literally thousands of times during the drilling operation. This means that the hose is subject to stress at the metal coupling (in addition to being subject to stress throughout its length). Thus, a highly reliable bond between the hose and the coupling is required for protection of personnel and equipment. If the hose breaks loose from the coupling, it could easily fall and cause severe damage on the drill floor of the rig. In a similar manner, if the hose breaks, circulation may be lost resulting in a well blowout situation.

In order to obtain a high-pressure flexible rubber hose (the term rubber is used generally and does not specifically mean natural occurring rubber gum), a hose manufacturer incorporates a reinforcing material. Thus, the hose will consist of an inside sealing membrane—the fluid tight element, an inner rubber element, a reinforcing element, an outer rubber element, and finally some sort of abrasive resistant covering. The reinforcing element can be polyester or similar organic material, carbon fiber or similar high technology material or metal (steel) generally in the form of wire or cable. The reinforcement generally is used in multiple layers called "plys" And usually made of steel.

There are four types of reinforcing employed by the hose manufacturer that is set down in even layers—i.e., 2 layers, 4 layers, 6 layers, etc., and grading systems are used to specify burst pressures for hose. For example, in the rotary drilling industry, grade C hose has a minimum burst pressure of 10,000 psi, grade D hose has a minimum burst pressure of 12,500 psi and grade E hose has a minimum (guaranteed) burst pressure of 18,750 psi. Grade C and D hose are 2 ply hose, although there is some 4 ply D hose. Most grade E hose is 4 ply. Swage end connectors are currently available for two ply hose and therefore the burst pressure range for C and D hoses is covered by the current art.

Generally a hose manufacturer manufactures flexible hoses to specific order by the purchaser who specifies length, diameter, pressure, service ratings and required end connections. These flexible hoses are generally referred to as a "hose assembly with end connectors" or "a built-up hose assembly." This term is used throughout the industry.

In a built up hose assembly with end connections, the manufacturer, during the course of manufacturing terminates the rubber hose into a metal fitting (the end connector) as specified by the purchaser. Thus, the manufacturer would make the inner rubber membrane ($1^{st}$ Carcass) and its associated inner seal layer (tube or inner tube) and terminate this assembly in the end connector. The manufacturer would then add the wire reinforcement, as needed, terminating each reinforcing wire (or cable) in the end connector. Two techniques are typically employed by hose manufacturers for terminating the wire reinforcing in or on the end connector itself but are beyond the scope of this discussion. Finally the outer rubber layer ($2^{nd}$ Carcass) and outer cover (cover) would be formed about the reinforcing wire or cable and the overall product vulcanized to achieve a cohesive product.

It takes time to manufacture a hose assembly with end connections by this method and often such a hose is needed almost immediately by industry. In order to service this demand a separate industry termed the local market distributor has evolved. The local market distributor keeps bulk reinforced hose—hose without connectors—in inventory. The purchaser would specify the hose requirements—diameter, length, pressure rating and end connectors—to the local market distributor. The local market distributor then takes bulk reinforced rubber hose from inventory, cuts the hose to required length, and places a coupling on each end of the hose. Bulk hose is available in varying lengths from a hose manufacturer, and the actual bulk length (between 90 and 110 feet) will depend on the mandrel used by the manufacturer.

The resulting hose is called a SWAGED or CRIMPED HOSE, depending on the method used to "place" the end connector onto the hose, where the term "place" is being used to include both swaging and/or crimping operations. It should be noted that swaging and crimping accomplish similar end results.

The current state of the art in swaged (or crimped) connectors has evolved to using an outer ferrule with lands (internal ridges) that are compressed around the end of a reinforced hose about a stem that is inserted into the end of the hose. The stem may or may not have barbs that are meant to improve the "grip" between the hose and the end connector. Often, the outer layer of the reinforced hose is "skived" which means that the outer carcass (the outer layer of rubber and abrasive resistant covering) is removed thereby exposing the reinforcement (although some local distributors do not skive).

The reinforced hose is actually held in the end connector by the ridges of the ferrule gripping the reinforcement via compression of the hose against the stem. The compression operation (swaging or crimping) of the ferrule against the reinforcement and against the inner stem creates severe stress and strain within the rubber of the hose and in particular the reinforcement.

It is known that multiple ply-reinforced hose may contain manufacturing defects (actually all reinforced hose may contain defects). During manufacture a ply may be out of position. That is, rather than lie next to each other a void (filled of course with rubber) may exist between the plys; the plys may be off-center; or, one or more cables may stand out (i.e., be slightly above the other cables). These defects can cause failure, if the defect is within or near the confines of the swaged or crimped connection.

The reason for the failure is relatively simple and relates back to stress imposed on the plys by the end connector. If a cable or ply is out of place, that element will be compressed more than the other elements. This additional compression puts more stress on the out-of-place reinforcement that can result in failure.

Development of high pressure swaged end connectors for rubber hose has extended over a period of years and the art runs the gauntlet from low temperature and/or low pressure to high temperature and/or high pressure applications. The hose diameters range from fractional centimeters [fractional inches] to fractional meters [tens of inches] and the manufacturers/providers of connectors realize that the pump-off force on the fitting is proportional to the inside diameter of the hose and the applied pressure.

As explained in U.S. Pat. No. 7,338,090 to Baldwin et at., which is incorporated in its entirety in this disclosure by reference, most of the standard prior art uses a serrated stem that has backward facing teeth that grips the inner liner of the hose to retain the stem in the hose. Further the art also uses a series of lands (ridges) within the ferrule that bite into the outer layer of the hose and the reinforcement and supposedly causes the teeth (or barbs) of the stem to bite further into the inner lining.

Baldwin et al. explain that the standard art causes severe failure of the reinforcing cable (or wire) because the sharp edges of the connector damage the reinforcement. In order to overcome this basic failure Baldwin et al. proposed an invention that consisted of a "waved" ferrule and stem that joins an end connector to flexible reinforced rubber hose thereby forming a "double sine-wave lock" between the ferrule and the stem, but mainly the lock forms within the ferrule (see U.S. Pat. No. 7,338,090). The ferrule and stem are welded together at the coupling end leaving an opening, which accepts the reinforced rubber (elastomer) hose in almost the same manner as a normal "ridged" ferrule and "barbed" stem fitting. Rather than having straight sides, the lands of the ferrule and the high points of the stem form a sinusoidal shape-wave. The wave pattern has the appearance of ripples on a pond caused by throwing a stone into the water.

The 'double sine-wave lock' invention locks all the plys of hose reinforcement inside the end connector, between the stem and ferrule, in a sine wave compressed against the ferrule and the stem to give the fitting an overall strength that is in excess of the strength of the free standing hose (without end connectors) whether or not the hose is under pressure. Grade E hose has a minimum burst pressure of 18,750 psi; thus the instant device, when used with grade E hose will have an overall strength greater than 18,750 psi. (At these pressures the pump-off forces involved reach or exceed 240,000 pounds$_{force}$ depending on the cross sectional areas.) The invention carefully considers the material forming the ferrule and stem and the relative movement of those materials while attaching the end connector to the hose along with the unpredictable qualities of rubber and flexible hose construction to minimize induced stress in the hose reinforcement. All of these factors, including the sinusoidal shape of the ferrule and stem and the preferred two-step method of attachment (internal expansion of the stem followed by external swaging of the ferrule), operate together to form the original Baldwin et al. invention.

In overall summary, the original Baldwin et al. 'double sine-wave lock' invention utilizes a sinusoidal wave-like lock within a ferrule and stem to lock the reinforcement plys and the hose into the end connector by compressing the hose and reinforcement between the waved ferrule and waved stem. Stress and strain on the reinforcement and the tendency for the reinforcement to tear (or pull away) from the rubber hose is minimized by carefully reducing the relative axial displacement between the ferrule and stem that always occurs during the attachment operation. The relative axial displacement is minimized by using high tensile strength steels, minimum un-attached clearances between the hose and end connector, and careful design of the node, lands grooves and flutes to cause a sine like wave while minimizing the radial thickness of the stem and ferrule at the critical cross-sections and considering the resulting strength of the attached fitting.

The Baldwin 'double sine-wave lock' has proven to work with any cable or wire high pressure reinforced hose and has in fact replaced the 'built-up' hose with end connectors, because the hose that utilizes the Baldwin double sine-wave end connector will not fail between the hose and the end connector. Any failure of the hose under pressure will be in the hose itself. THE END CONNECTOR WILL NOT COME LOOSE FROM THE HOSE: this statement cannot be made regarding built-up hoses. Thus, the 'double sine-wave lock' Baldwin end connector has improved safety in the workplace. No longer will a hose come loose and flop all over the area damaging equipment and injuring personnel.

The "double-lock" end connector requires a two step connection process. The connector is placed on the hose and the stem is internally expanded. The resulting assembly is then placed in a swaging press and the ferrule is swaged onto to the hose/stem. In developing their invention, the inventors wondered if such a two step process was needed and if large (relatively) lands and grooves were required on the stem. It was known that the actual lock occurred between the ferrule and the reinforcement with some minimal lock (transfer of pump-off force) between the stem and the reinforcement. If a stem could be designed with small bumps and if a connection step could be eliminated an improved device would result. More importantly, the removal of the expansion step would reduce the amount of material movement within the hose during the swaging/expansion process. With the reduction of material movement within the hose itself, an improved seal and lock could result with a reduction in induced stress.

In the past several years hose manufacturers (particularly in Europe) have been producing a light weight high pressure reinforced rubber hose. This hose uses wire or cable reinforcement but uses a much thinner inner tube. The inner tube is the non-leaking flexible conduit through which a high pressure fluid passes. The expansion force is transferred to the reinforcement which prevents the inner tube from bursting. In order to reduce the overall hose weight, the manufacturer is using a thin tube and a thin outer cover. As these materials become thinner, the requirement that movement between the components of the hose, (i.e., the inner tube, reinforcement and outer cover) becomes more critical. Thus there remains the need for a sine-wave lock device that produces minimal stress during the connection process between the connector and the reinforced hose used in rotary hoses and other high pressure rubber hoses.

The API (American Petroleum Institute, which produces the definitive standards for the industry) introduced stricter standards for rotary hoses in October 2006. These stricter standards resulted in three temperature ranges and three "Flexible Specification Levels (standards)" for high pressure rotary hose. The temperature standards are as follows.

Temperature Range I: −20° C. to +82° C. [−4° F. to +180° F.]
Temperature Range II: −20° C. to +100° C. [−4° F. to +212° F.]
Temperature Range III: −20° C. to +121° C. [−4° F. to +250° F.]

The Flexible Specification levels are as follows.

FSL 0: Cement hoses only—no pulsation
FSL 1: Rotary, vibrator and jumper hoses—normal service only—no high frequency pulsation.
FSL 2: Rotary, vibrator and jumper hoses—likely to incur high frequency vibrations exceeding 6.9 MPa [1000 psi] during operation.

Unfortunately, these new API standards caused a series of failures in most (if not all) swaged end connectors particularly in Temperature Range III and FSL 2 during testing. In the case of temperature range III, the inner tube (the actual liquid containing element in a high pressure reinforced) hose melts resulting in disengagement of the connector from the hose, leakage within the end connector or both. Unfortunately, the same failures happen in built-up hose and for the same reason. Neither of these conditions is tolerable and thus there remains a need for high pressure end connector that will meet the new API standards.

SUMMARY OF THE INVENTION

Both embodiments of the invention consists of an improvement to the sine-wave lock disclosed in U.S. Pat. No. 7,338,090 to Baldwin et al, wherein the improvement is a ferrule wherein all the flutes follow a modified (sine x)/x function in that the flutes go from a maximum height at the termination end of the connector to a minimum height at the hose end of the connector. The lands between the flutes are sloped or curved following a modified (sine x)/x function. The associated stem has a series of matching bumps that, when the swaging operation is complete, align within the center of the lands of the ferrule. Although the bumps have heights that vary from a maximum at the termination end of the connector to a minimum at the hose end of the connector, there is no true modified (sine x)/x that defines the bumps (unlike the original Baldwin et al. invention). The stem and ferrule are connected together by a suitable process, such as welding.

The end connector is joined to the reinforced hose in the standard manner which may involve skiving the outer jacket for the first embodiment and skiving both the outer jacket and the inner carcass for the second embodiment. The hose is carefully placed within the end connector cavity formed between the ferrule and the stem to the point where the end of the inner tube rests just past the last flute and within the last land at the termination end of the connector in the first embodiment. In the second embodiment the inner tube still rests just past the last flute and within the last land, but the reinforcement continues further into the connector where a series of additional flutes and lands will contact the exposed reinforcement. The fitting is then preferentially swaged onto the hose using standard techniques.

As the swaging process occurs, the small bumps on the stem create an offset force which causes the reinforcing to expand into the lands of the ferrule forming the sine-wave lock between the reinforcement and the lands and flutes of the ferrule.

The stem may be coated, during manufacture or at any time, with a friction reducing material that allows the inner tube of the reinforced hose to more freely slide along the stem during the process that swages (or crimps) the connector to the hose. An expansion area for excess rubber and other 'by-products' (such as 'extruded reinforcing material') of the swaging operation is provided at the termination end of the connector (i.e., between the ferrule and stem at the termination end of the connector).

BRIEF DESCRIPTION OF THE DRAWINGS

FIG. 8A is an engineering drawing from the side taken about the longitudinal center line of the ferrule of the second and preferred embodiment of the improved end connector.

FIG. 8B is a cross-section taken at 8B.

FIG. 8C is a cross-section taken at 8C.

FIG. 9A is an engineering drawing from the side taken about the longitudinal center line of the stem of the second and preferred embodiment of the improved end connector.

FIG. 9B is a cross-section taken at 9B.

FIG. 9C is a cross-section taken at 9C.

FIG. 14 gives a table of connector dimensions for the second embodiment in the British System of Units.

FIG. 15 gives a skiving table for the second embodiment in the British System of Units.

DESCRIPTION OF THE EMBODIMENTS

Figure 1:
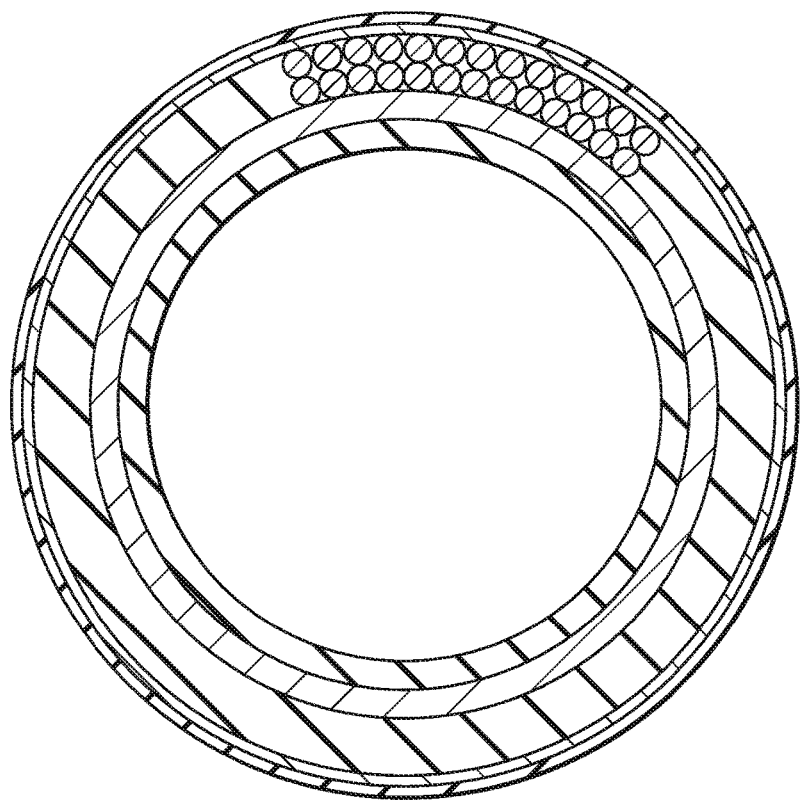
FIG. 1 shows the cross-section of a typical cable reinforced flexible rubber hose.
Figure 2:
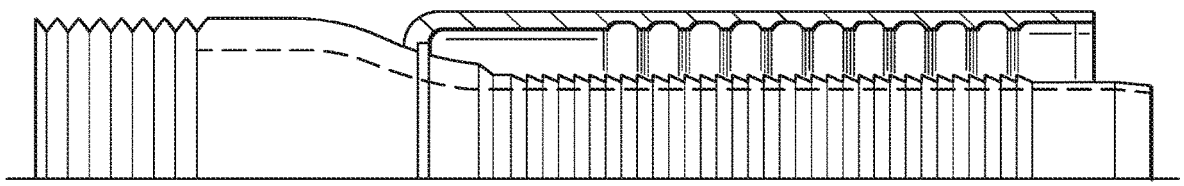
FIG. 2 shows a cross-sectional view of the current state of the art end standard connector with an NTP termination. (This is an old-style connection in use for many decades.)
Figure 3A:
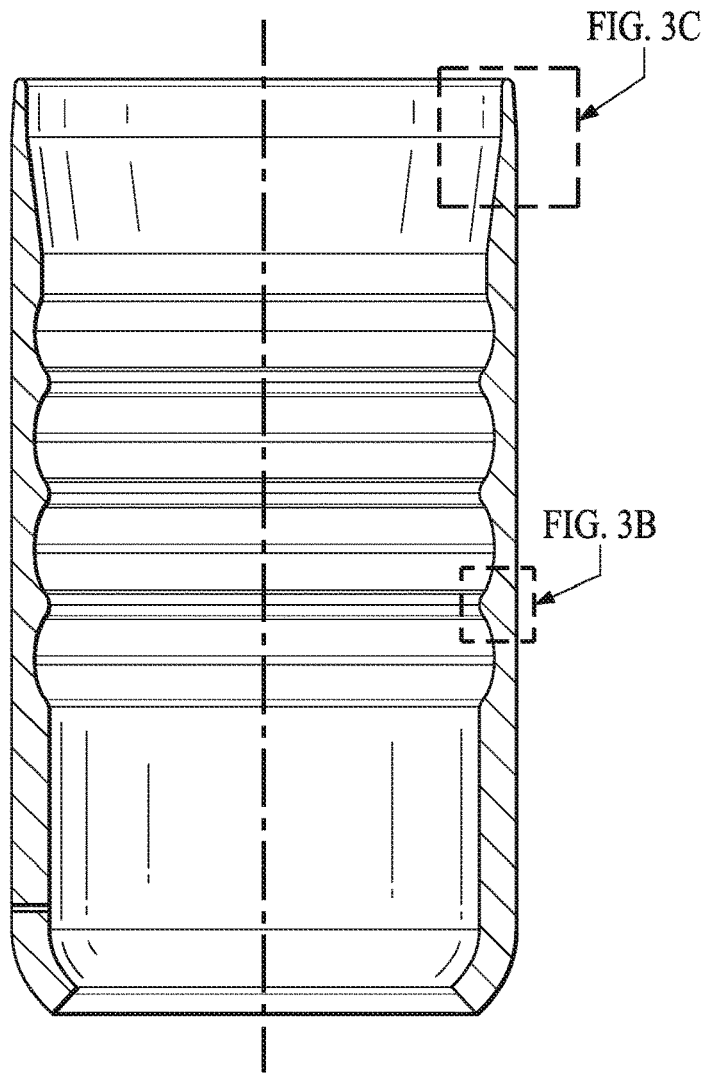
FIG. 3A shows a cross-sectional view of the ferrule used in the advanced current state of the art 'double lock sine-wave' end connector. (The 'double lock sine-wave' end connector has been in use for the past five years.)
Figure 3B:
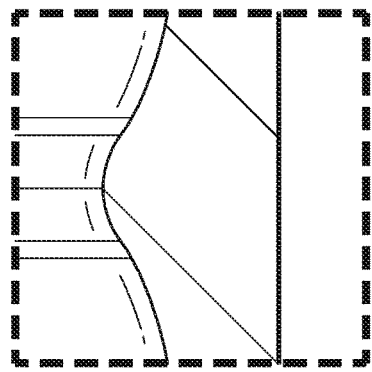
FIG. 3B is a cross-section taken at 3B.
Figure 3C:
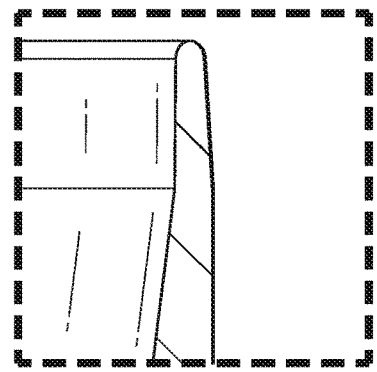
FIG. 3C is a cross-section taken at 3C.
Figure 4A:
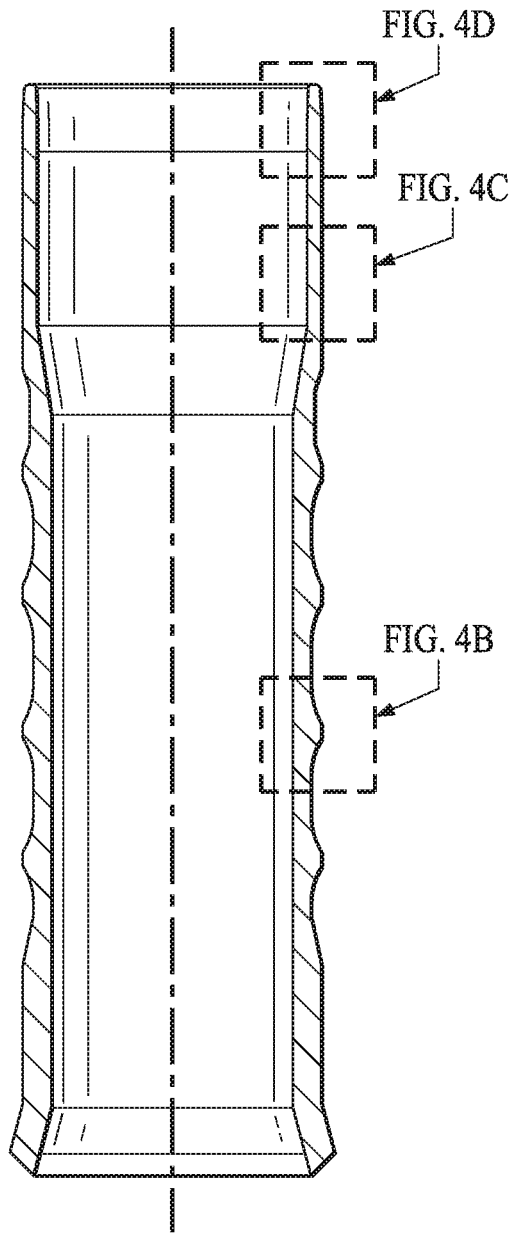
FIG. 4A shows a cross-sectional view of the stem used in the advanced current state of the art 'double lock sine-wave' end connector.
Figure 4B:
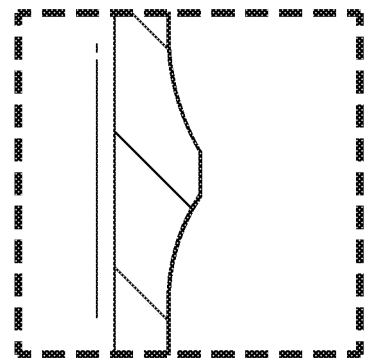
FIG. 4B is a cross-section taken at 4B.
Figure 4C:
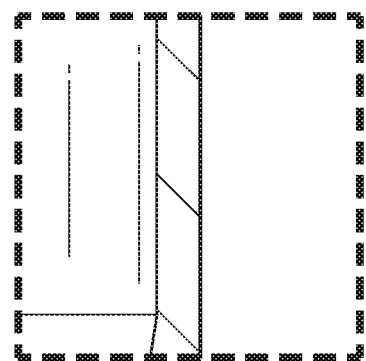
FIG. 4C is a cross-section taken at 4C.
Figure 4D:
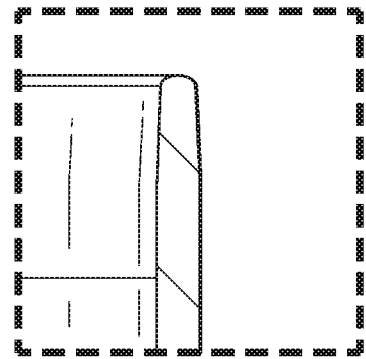
FIG. 4D is a cross-section taken at 4D.

FIG. 1 shows a standard weight schedule D cable reinforced hose. Schedule E hose will generally have 4 interlocking reinforcing plys. Not shown is a cross-section of a European light weight wire reinforced hose; however, it would be similar to FIG. 1, except there would be 6 interlocking wire plys and the inner tube would comprise one thin layer of rubber.

The ferrule of the first embodiment of the instant invention is shown, in cross-section, in FIG. 5 and is machined from 4"×0.337W Schedule 80 Pipe. [It is difficult to give metric equivalents.] The ferrule of the second embodiment is shown, in cross-section, in FIG. 8 and is machined from 9.00×0.750 wall mechanical tube (DOM). [It is difficult to give metric equivalents.] One end (the end that will be welded to the stem) is placed in a Roll Die and compressed to form a narrower neck as shown at the far left in FIGS. 5 and 8. The inside of the ferrule is machined to produce a series of lands and flutes (a total of six are shown in FIG. 5 with a total of ten being shown in FIGS. 8A-8C).

Figure 5A:
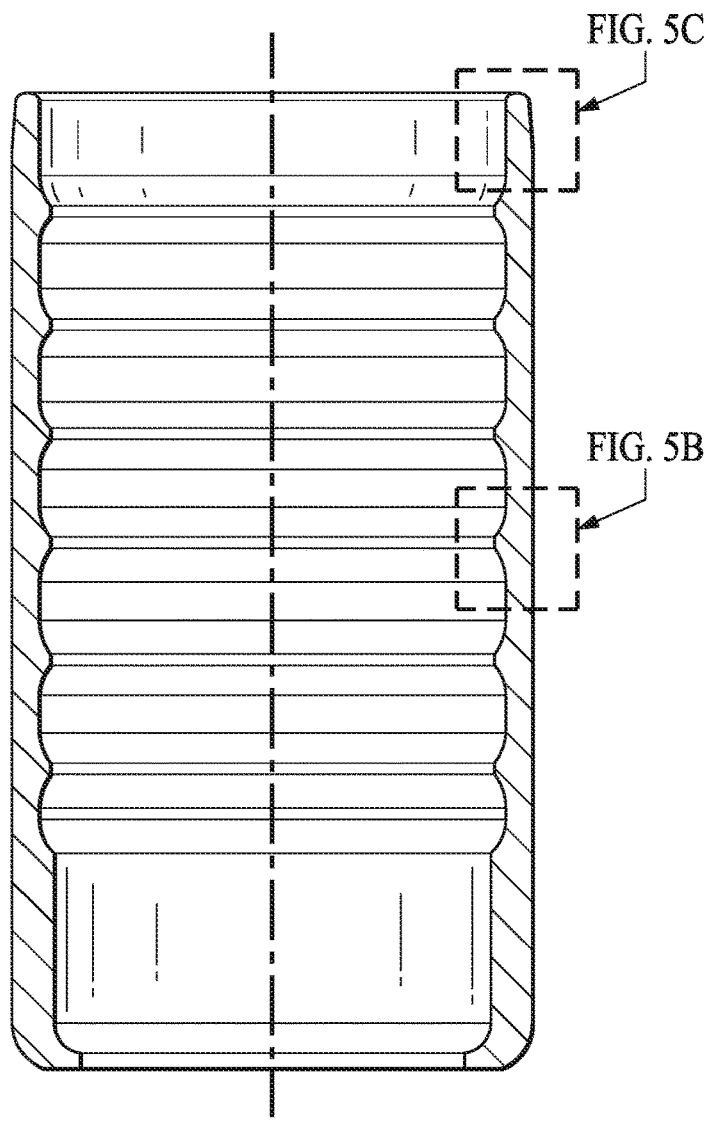
FIG. 5A shows the cross-sectional view of the ferrule used in the first embodiment of the instant invention, being a general improvement to the 'double lock sine-wave' connector. (Note the similarities between FIGS. 3A and 5A.)
Figure 5B:
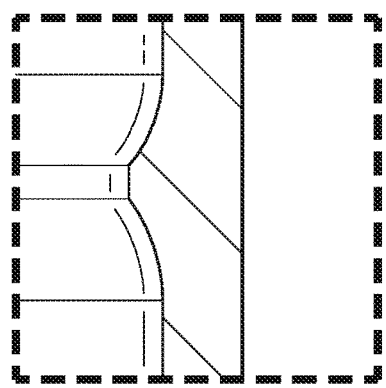
FIG. 5B is a cross section taken at 5B.
Figure 5C:
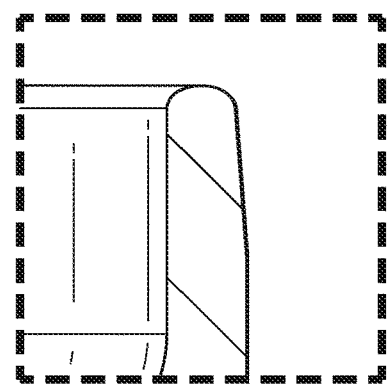
FIG. 5C is a cross-section taken at 5C.

In FIGS. 5A-5C the first embodiment, the lands all have the same radial height measured from the axial center line of the ferrule being $4.03^{\varphi}$. The first and second flutes (counting from the hose end of the ferrule) have a radial height of $3.88^{\varphi}$, the third flute has a height of $3.86^{\varphi}$ and the final three flutes have a height of $3.83^{\varphi}$. FIGS. 8A-8C, being the second embodiment, is somewhat different and will be described in detail later paragraphs. In both embodiments the flutes are NOT axially spaced equidistantly along the ferrule. This is because it is known that as the ferrule is swaged (beginning from the hose end), the ferrule will move axially towards the hose end of the fitting until the reinforcement locks between the ferrule and the stem. The actual lock will not start to occur until the swage is about midway along the ferrule. Up to this point the inner tube and hose is free to move axially away from the termination end of the fitting. When lock occurs, all movement of the inner tube and hose will be towards the termination end of the fitting.

Simple mechanical calculations based on material properties and the degree of swaging that will be applied allow the designer to calculate the flute spacing so that after the fitting is swaged to the hose, the bumps of the stem will fall approximately midway inside the lands of the ferrule. The manner in which the final position of the bumps at approximately midway within the lands is the key to this device and how it obtains the sine-wave lock between the reinforcement and the ferrule.

The dimensions of the land and flute heights must not be read as a restriction but as an example. Similarly, the flute spacing shown must not be read as a restriction but as an example. Under some circumstances (larger diameter hose), it may be necessary to adjust these dimensions so that they vary with distance from the hose end forming an overall slope.

At the end of the connector nearest the hose, the inside diameter of the ferrule is increased so that when the ferrule is swaged minimum pressure will be exerted on the rubber outer covering. The hose end is rounded as shown.

Figure 6A:
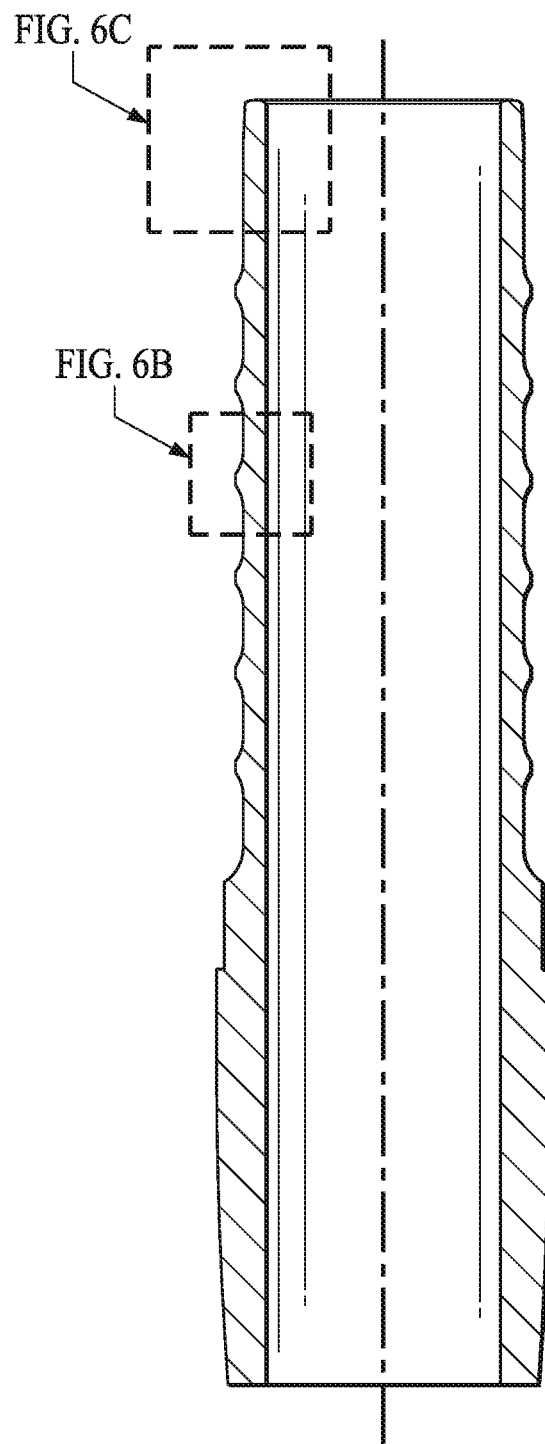
FIG. 6A shows the cross-sectional view of the stem used in the first embodiment of the instant invention, being a general improvement to the 'double lock sine-wave' connector and forming a single lock sine wave within the overall device. (Note the dissimilarities between FIGS. 4A and 6A.)
Figure 6B:
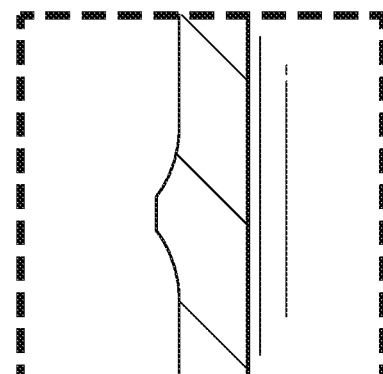
FIG. 6B is a cross-section taken at 6B.
Figure 6C:
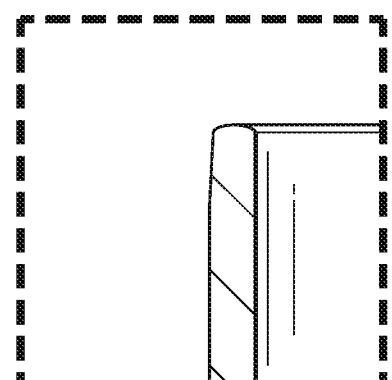
FIG. 6C is a cross-section taken at 6C.

The stem of the first embodiment of the instant invention is shown, in cross-section, in FIGS. 6A-6C and is machined from 3"×437W Schedule SMLS Pipe. Six "bumps" are 0.06-inches and are equidistantly machined in the stem. As explained above, the relative position of the bumps on the stem and the lands on the associated ferrule is critical to forming the sine-wave lock between the ferrule and the reinforcement. Again, the dimensions given must not be construed as a restriction but as an example. This is because this dimension will vary with the size of the fitting and the type of reinforced hose. Any engineer with knowledge of materials and swaging may readily make adjustments to this disclosure for varying sizes of fittings, hose, hose type and materials that could be used in the manufacturer of the fitting. In fact the size of the bumps should be chosen by trial and error to have a minimum height just so that the bumps cause the sine-wave lock of the reinforcement plys in the ferrule. The best way to obtain the correct dimensions and spacing of flutes, lands, and bumps to by trial and error. Calculations will help.

Figure 7:
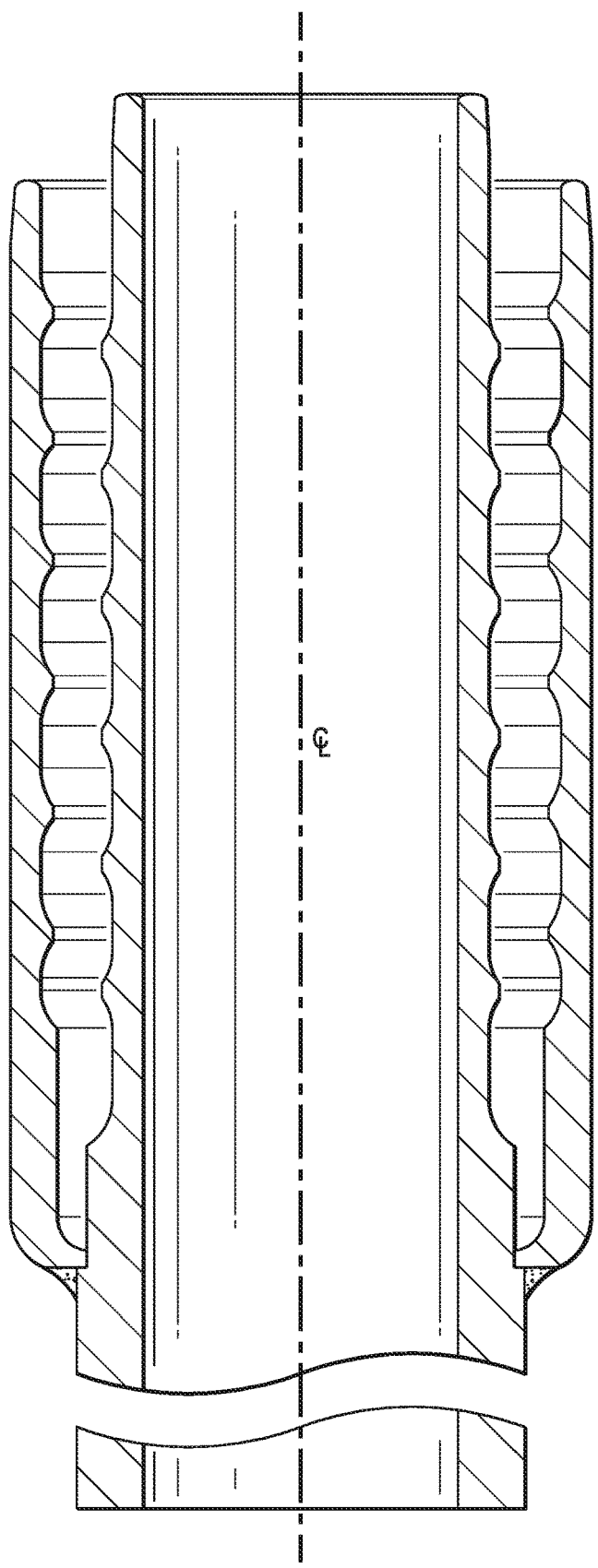
FIG. 7 is a sketch of the first embodiment of the improved end connector taken about the longitudinal center line showing the ferrule joined to the stem.

The ferrule of FIGS. 5A-5C is welded to the stem of FIGS. 6A-6C at the ledge on the stem and the complete assembly (being the first embodiment) is shown in FIG. 7. The weld is carefully inspected to assure quality. If the completed fitting is to be used in $H_2S$ service, the fitting must be heat treated to reduce the possibly of hydrogen-sulphide stress cracking.

The first embodiment fitting is permanently attached to a reinforced high pressure rubber hose using industry standard techniques—yet another plus for the device. The outer covering is usually skived to expose the reinforcement. The axial length of the skive is set by the axial length of the ferrule: one must make certain that approximately ½-inch of the outer cover falls under the hose end of the ferrule before swaging. The hose is then carefully placed within the cavity formed between the ferrule and the stem to approximately ½-inch from the far end of the cavity. This space allows for expansion of the hose during the swaging operation.

As explained earlier, the swaging operation starts at the hose end of the fitting and moves axially along the fitting to the termination. As the ferrule is swaged, it moves radially inward towards the stem and axially outward towards the hose. As the ferrule moves axially inward, the stem bumps act to displace all plys of the reinforcement into the lands of the ferrule. At approximately midway along the ferrule (during swaging) the reinforcement at the hose end will lock in the form of a sine wave (following the shape of the ferrule). As the swaging operation continues, the ferrule will move axially away from the hose end of the fitting along with the hose. The sine wave lock progressively moves with the swage until swaging is stopped just past the last flute—away from the hose end. The ferrule will actually expand radially about the stem resulting in a volume which receives the excess rubber from the hose.

It must be understood that there is no mechanical lock between the inner tube of the hose and the stem in the first embodiment. The mechanical lock is found between the lands and flutes of the ferrule in the form of a modified sine-wave and the reinforcement. During the course of testing to meet the newer API standards it was found that the first embodiment did not stand up to the new API standards for temperature and flexibility, hence the device was further enhanced to result in the second embodiment. However, the first embodiment of the device is still an improvement to the double-lock Baldwin device and adds to the art.

Now let us examine the second and preferred embodiment which is a modification of the first embodiment necessitated by the new API standards for rotary hose involving both temperature and flexibility. As explained in the background section of this patent, the higher temperature causes the inner tube of a reinforced hose to more or less turn to mush which results in two problems. First, the lock between the reinforcement and the connector fails because the rubber turns to jelly, and, second, a swaged connector slides off the hose. In the case of both a swaged connector and a built-up hose assembly, the mushy (due to temperature) inner hose leaks and fluid comes out between the hose and the connector. Both the tendency for a swaged connector to come loose and the tendency for both a swaged connector and a build-up hose connector to leak are exacerbated by the flexibility standard. Hence the concept of the first embodiment was expanded to solve the problem.

FIGS. 8A-8C shows the ferrule for the second and preferred embodiment. There are essentially three sets of flutes (bumps) and lands (grooves) and a termination gripping section. Starting at the end of the connector furthermost away from the hose (the left side in the FIG. 8A), there is a 'zero' or expansion area, followed by the first set of four flutes all having the same radial height measured from the axial center line of the ferrule being 7.52$^\varphi$ with the lands between the first set of flutes having a radial depth of 7.78$^\varphi$. The second set of flutes (two) has the same radial height and the third set of flutes (four) being 7.50$^\varphi$ and the land between these two flutes has a radial depth of 7.76$^\varphi$. The lands between the third set of flutes has a radial depth of 8.03$^\varphi$. Finally the there is a termination flute that is slopped and tappers off from a radial height of 7.67$^\varphi$ towards the end of the connector that touches the outer jacket of the hose. As stated earlier, in both embodiments the flutes are NOT axially spaced equidistantly along the ferrule.

The stem of the second embodiment of the instant invention is shown, in cross-section, in FIGS. 9A-9C and is machined from 6⅝-inch O.D. mechanical tubing—Gr. 4130 [again it is difficult to give a metric equivalent]. Starting from the end furthermost from the hose (the left side in the Figure) there are two longitudinal flat areas having a relative height of 6.413$^\varphi$ and 5.46$^\varphi$. It will be seen that the first of these two areas acts in conjunction with the ferrule after and during swaging to form an expansion zone (zone 1). The second area acts as a stop to the reinforcement as the hose is placed within the complete connector as well as allowing some movement of the reinforcement during swaging until the swage operation reaches this zone at which the ferrule and stem will crimp about the reinforcement to form a first gripping zone (zone 2) when the connector is swaged.

This is followed by four flutes also having a relative height of 5.46$^\varphi$. It will be seen that this set of flutes and lands will align with the first set of flutes and lands of the ferrule after swaging to form a second gripping zone (zone 3). The lands between these flutes have a relative depth of 5.33$^\varphi$. The last flute is somewhat different and is followed by another (third) longitudinal flat area having a relative height of 4.98$^\varphi$. It will be seen that this area will align with the second set of flutes and lands in the ferrule to form a third gripping zone (zone 4), which will act somewhat like a double crimp when the connector is swaged. (Note the backward slope in the transition between the flute and the flat spot—this is not necessary but will be explained.) This is followed by a series of four bumps having a height of 4.98$^\varphi$ with lands between the bumps having a relative depth of 4.88$^\varphi$. It will be seen that these bumps will align with the third set of flutes and lands in the ferrule to form a sinusoidal like fourth gripping zone (zone 5).

There is then a gentle transition back to a flat area having a relative height of 4.98$^\varphi$. It will be seen that this transition acts in conjunction with the ferrule to form a stress reduction and termination zone (zone 6). As explained above, the relative position of the bumps and flutes on the stem and the lands on the associated ferrule is critical to forming the sine-wave lock between the ferrule, the reinforcement, and the stem.

Again, the dimensions given must not be construed as a restriction but as an example. This is because this dimension will vary with the size of the fitting and the type of reinforced hose. Any engineer with knowledge of materials and swaging may readily make adjustments to this disclosure for varying sizes of fittings, hose, hose type and materials that could be used in the manufacturer of the fitting. In fact the size of the bumps should be chosen by trial and error to have a minimum height just so that the bumps cause the sine-wave lock of the reinforcement plys in the ferrule. The same techniques used in the first embodiment to obtain the correct height, depths and spacing must be employed, i.e., trial and error.

Figure 10:
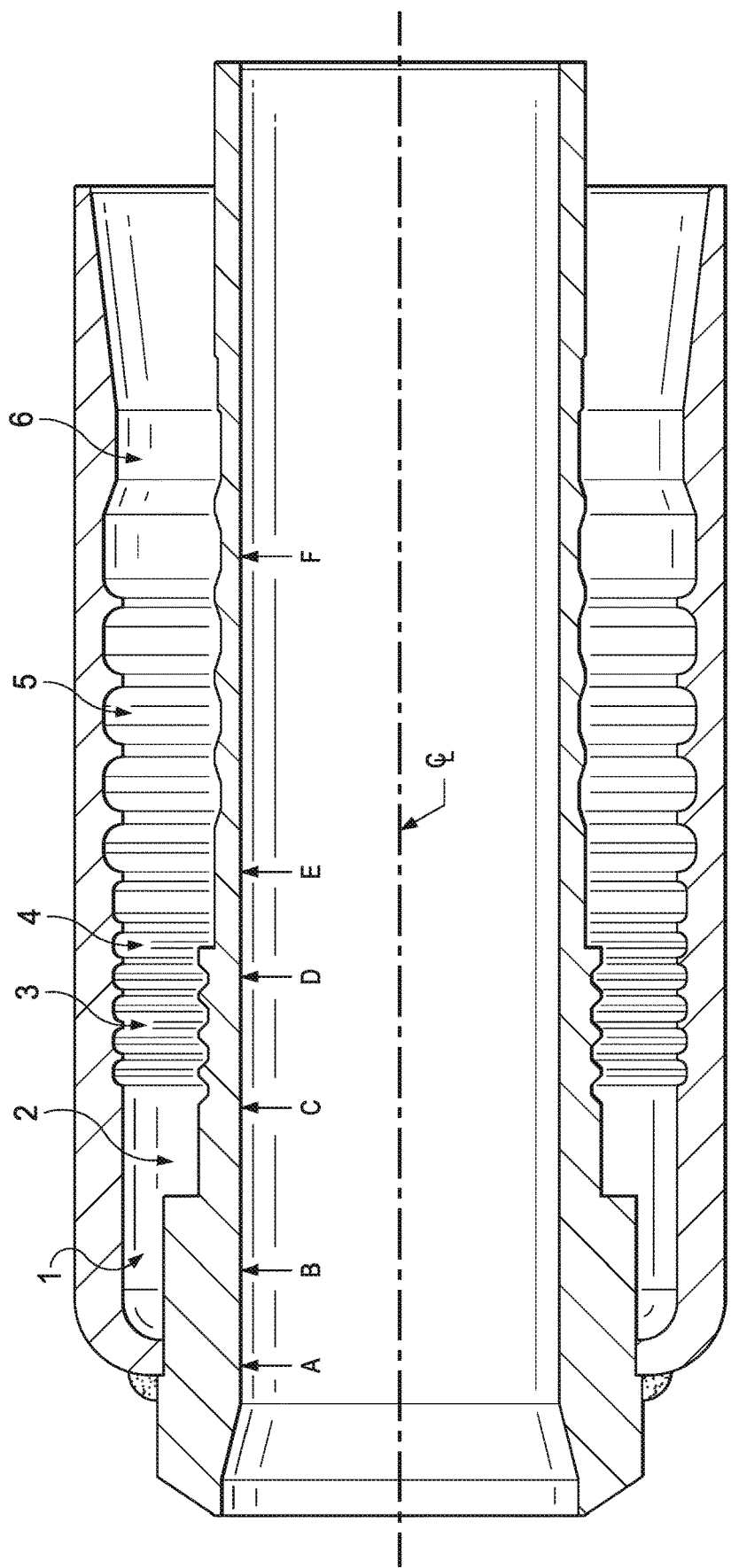
FIG. 10 is a sketch of the second and preferred embodiment of the improved end connector taken about the longitudinal center line showing the ferrule joined to the stem. This figure also defines certain terms used in the disclosure and the gripping zones used in the claims.

The ferrule of FIGS. 8A-8C is welded to the stem of FIGS. 9A-9C at the ledge on the stem and the complete assembly (being the second embodiment) is shown in FIG. 10. The weld is carefully inspected to assure quality. If the completed fitting is to be used in H$_2$S service, the fitting must be heat treated to reduce the possibly of hydrogen-sulphide stress cracking.

The second embodiment fitting is permanently attached to a reinforced high pressure rubber hose using highly modified industry standard techniques. First the outer covering is skived to expose the reinforcement. The axial length of the outer skive is set by the axial length of the ferrule: one must make certain that approximately ½-inch of the outer cover falls under the hose end of the ferrule before swaging. Second, the inner carcass, which is essentially the inner tube, is skived to expose the reinforcement (not a usual procedure in rotary hose). The axial length of the internal skive is set by the axial length of the fitting between points "B" and "D" (see FIG. 10).

The hose is then carefully placed within the cavity formed between the ferrule and the stem to approximately where the reinforcement rests against point "B," which acts as a stop against the reinforcement, and the inner tube rests against point "D", thus assuring proper placement of the hose within the connector. The space between points "A" and "B" allows for expansion of the hose and or the reinforcement during the swaging operation.

As explained earlier, the swaging operation starts at the hose end of the fitting and moves axially along the fitting to the coupling end. As the ferrule is swaged, it moves radially inward towards the stem and axially outward towards the hose. As the ferrule moves axially inward, the stem bumps act to displace all plys of the reinforcement into the lands of the ferrule. At approximately point "D" within the connector (during swaging) the reinforcement at the hose end will lock in the form of a sine wave (following the shape of the ferrule). As the swaging operation continues past point "D" toward point "A", the ferrule will move axially away from the hose end of the fitting along with the hose. The sine wave lock between the stem, reinforcement and ferrule progressively moves with the swage until swaging is stopped just past the last flute near point "B". Sometimes the swaging will continue to a point between points "B" and "A". The ferrule will actually expand radially about the stem resulting in a volume which receives the excess reinforcement from the hose (zone 1).

It must be understood that there is a mechanical lock between the stem and the ferrule between points "B" and "C" as a 'crimp' (the first gripping zone—zone 2) and then there is the important mechanical lock between points "C" and "D" in the form of a modified sine-wave (zone 3). It is this sinusoidal lock (the second gripping zone) that holds the connector to the hose. There is then a further mechanical lock found between points "D" and "E" being the third gripping zone formed between the second set of flutes and lands on the ferrule and the third flat area of the stem (zone 4).

The set of bumps located between points "E" and "F" on the stem interact with the third set of flutes and lands on the ferrule to form a fourth gripping zone which results in the form of a modified sine-wave between the inner carcass and the reinforcement (zone 5). It is this lock that stops the fluid from leaking around the stem of the connector and to the outside of the hose when the inner tube turns mushy due to high temperatures. Essentially this sinusoidal lock is the same as the first embodiment.

Figure 11:
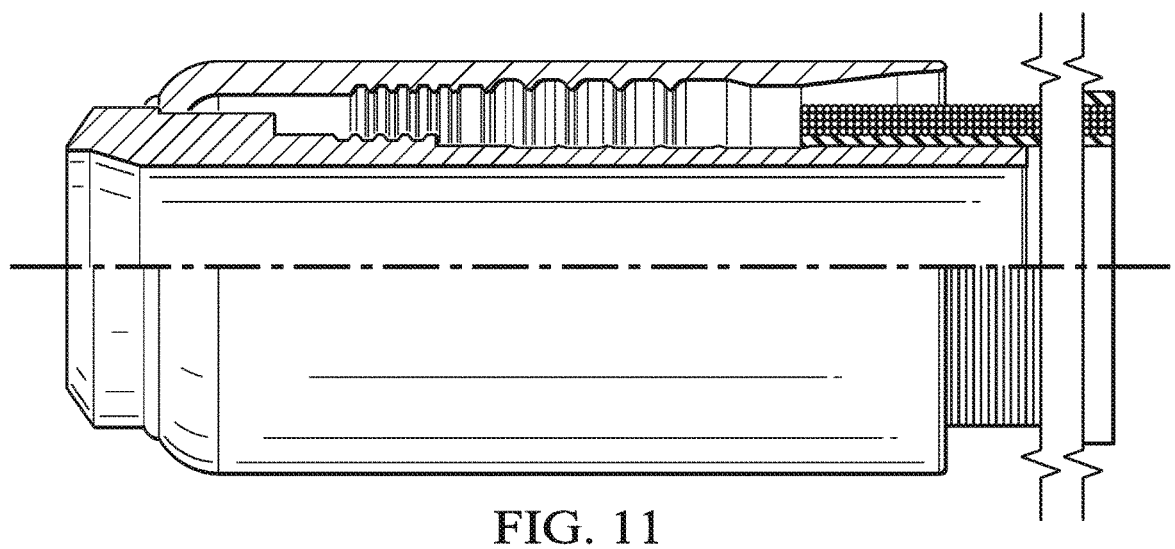
FIG. 11 shows the second and preferred end connector immediately before the "double-skived" high pressure reinforced hose is inserted into the end connector. Note that inner tube has been removed as well as the outer cover to expose the reinforcement.
Figure 12:
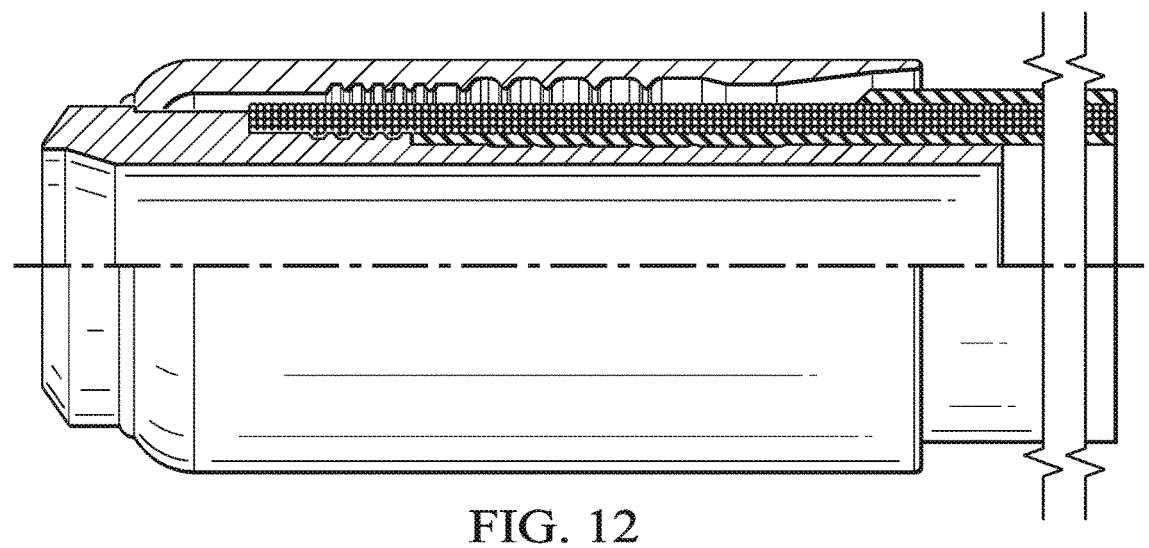
FIG. 12 shows the second and preferred end connector immediately after the "double-skived" high pressure reinforced hose is inserted into the end connector and before swaging.
Figure 13:
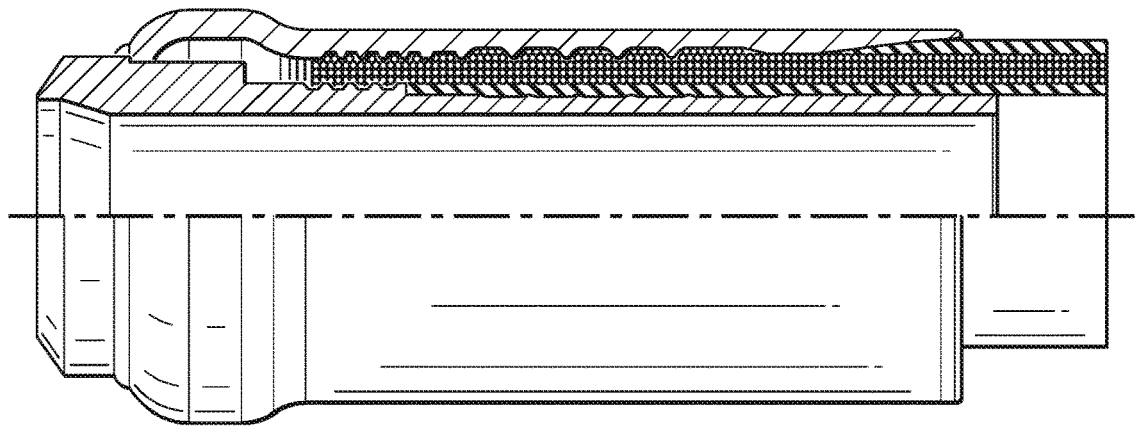
FIG. 13 shows the second and preferred end connector with the "double-skived" high pressure reinforced hose inserted into the end connector and after swaging is complete.

Finally, the transition area between point "F" and the end of the connector interacts with the termination flute of the ferrule to form a fifth gripping and termination zone (zone 6). The process is illustrated in FIGS. 11 through 13. It is possible to skip the second skive (i.e., the section of hose that falls in zone 5)—as in the first embodiment; however, the probability of fluid leakage will now be present.

Now let us try to understand the operation of the swaged connector when the hose is subjected to high temperature fluids which tend to cause the inner tube to become mushy (i.e., the inner tube looses strength and turns to jelly). The lip at point "D" inhibits the passage of mushy rubber back towards the open end of the connector. Similarly the corresponding slopped sections of the ferrule and stem (sloping towards each other when swaged) at the hose end of the connector in conjunction with the double crimp lock between points "D" and "E" and the sine-wave lock between point "E" and "F" of the connector serve to retain the mushy inner carcass thereby preventing fluid leak from the connector. Finally, because of the sine-wave lock between the reinforcement, the stem, and the ferrule (between points "C" and "D"); the connector cannot be pumped-off from the hose. The pump-off force is transferred from the first connector (at one end of the hose) to the reinforcement through the hose (the actual reinforcement) and onto the second connector (at the other end of the hose). Providing the reinforcement is not damaged (the point of the sine-wave lock), then the reinforcement will not fail within the connector. However, any failure will occur in the hose which makes the whole assembly much safer.

The inventive step is the realization that a series of bumps in the stem could replace the original double sine wave lock of the Baldwin et al device. Furthermore, this device no longer requires expansion of the stem and no longer requires a step in the stem to reduce column buckling. Furthermore, machining is simplified and the number of elements (double lock sine) is reduced to a single lock sine wave. The second embodiment of the device is an improvement to the double-lock Baldwin device, adds to the art, and meets the new API specifications.

It must be remembered that all dimensions given in this disclosure are for example and must not be read a limitation because dimensions will change with hose diameter and pressure ratings. The number of corresponding flutes and lands will be set by the diameter of the hose and the pressure rating and thus are subject to change. Two examples have been given, one for three inch hose (the first embodiment) and one for five inch hose (the second embodiment). Two tables are shown in FIGS. 14 and 15 which give the fundamental dimensions for the second embodiment connector, as well as details as to skive dimensions. The techniques described in this disclosure will allow a person skilled in the manufacturing art to duplicate the two embodiments for various diameters and pressure ratings.

A high pressure rotary hose assembly can readily be assembled from a specified length of specified high pressure hose from either of the two embodiments disclosed above by the hose manufacturer or a local distributor. As the specifications increase in temperature and flexibility requirements the hose assembly would be swaged from the second and preferred embodiment.

What is claimed is:

1. An end connector for permanent attachment to reinforced hose having reinforcement, comprising:
    a stem having a coupler end and a hose receiver end; and
    a ferrule attached to the stem at an attachment point adjacent the coupler end, the stem and ferrule having a cavity located therebetween, extending along a length of the end connector, configured to receive an end of a reinforced hose therein, and divided into: at least two gripping zones extending from adjacent a point where the ferrule is attached to the stem toward the hose receiver end, the at least two gripping zones including:
    a first gripping zone located adjacent the attachment point where the ferrule is attached to the stem and having a first set of at least three flutes and lands formed in the stem, and a second set of at least three flutes and lands formed in the ferrule, wherein an axial distance between each of the flutes of the first set in the stem is different from an axial distance between each of the flutes of the second set in the ferrule, as taken along a longitudinal central axis of the end connector; and
    a second gripping zone located nearer the hose receiver end than the first gripping zone and having a third set of at least three flutes and lands formed in the stem, wherein an axial distance between each of the flutes of the third set in the stem is different from the axial distances between each of the flutes of the first set and each of the flutes of the second set, as taken along the central axis, and having a fourth set of at least three flutes and lands formed in the ferrule, wherein an axial distance between each of the flutes of the fourth set in the ferrule is different from the axial distance between each of the flutes of the second set in the ferrule, as taken along the central axis.

2. The end connector of claim 1, wherein the number of flutes and lands or the size of the flutes and lands of the first set is different from the number of flutes and lands or the size of the flutes and lands of the second set.

3. The end connector of claim 1, wherein the number of flutes and lands or the size of the flutes and lands of the third set is different from at least one of the first and second sets.

4. The end connector of claim 3, wherein the number of flutes and lands or the size of the flutes and lands of the third set is different from both the first and second sets.

5. The end connector of claim 1, wherein the number of flutes and lands or the size of the flutes and lands of the third set is different from the number of flutes and lands or the size of the flutes and lands of the fourth set.

6. The end connector of claim 1, wherein the first gripping zone further includes a reinforcement liner stop formed in the stem and located nearer an expansion zone than the first set of at least three flutes and lands.

7. The end connector of claim 6, wherein the first set of at least three flutes and lands is located between the reinforcement liner stop and an inner liner stop formed in the stem located nearer the hose receiver end than the first set of at least three flutes and lands.

8. A high pressure reinforced hose assembly, comprising:
an end connector having a coupler end and a hose receiver end, comprising:
a ferrule attached to a stem at an attachment point adjacent the coupler end, the stem and ferrule having a cavity located therebetween, extending along a length of the end connector, configured to receive an end of a reinforced hose therein, and divided into: at least two gripping zones extending from adjacent a point where the ferrule is attached to the stem toward the hose receiver end, the at least two gripping zones including:
a first gripping zone located adjacent the attachment point where the ferrule is attached to the stem and having a first set of at least three flutes and lands formed in the stem, and a second set of at least three flutes and lands formed in the ferrule, wherein an axial distance between each of the flutes of the first set in the stem is different from an axial distance between each of the flutes of the second set in the ferrule, as taken along a longitudinal central axis of the end connector; and
a second gripping zone located nearer the hose receiver end than the first gripping zone and having a third set of at least three flutes and lands formed in the stem, wherein an axial distance between each of the flutes of the third set in the stem is different from the axial distances between each of the flutes of the first set and each of the flutes of the second set, as taken along the central axis, and having a fourth set of at least three flutes and lands formed in the ferrule, wherein an axial distance between each of the flutes of the fourth set in the ferrule is different from the axial distance between each of the flutes of the second set in the ferrule, as taken along the central axis; and
a section of high pressure reinforced hose having first and second ends, an innermost liner, and one or more reinforcement layers located over the innermost liner, the first end being received within the cavity.

9. The high pressure reinforced hose assembly claim 8, wherein the number of flutes and lands or the size of the flutes and lands of the first set is different from the number of flutes and lands or the size of the flutes and lands of the second set.

10. The high pressure reinforced hose assembly of claim 8, wherein the number of flutes and lands or the size of the flutes and lands of the third set is different from at least one of the first and second sets.

11. The high pressure reinforced hose assembly of claim 10, wherein the number of flutes and lands or the size of the flutes and lands of the third set is different from both the first and second sets.

12. The high pressure reinforced hose assembly of claim 10, wherein the number of flutes and lands or the size of the flutes and lands of the third set is different from both the first and second sets.

13. The high pressure reinforced hose assembly of claim 8, wherein the number of flutes and lands or the size of the flutes and lands of the third set is different from the number of flutes and lands or the size of the flutes and lands of the fourth set.

14. The high pressure reinforced hose assembly of claim 13, wherein the first gripping zone further includes a reinforcement liner stop formed in the stem and located nearer the coupler end than the first set of at least three flutes and lands, wherein ends of the first set of at least three flutes and lands are defined by the reinforcement liner stop and the innermost liner.

15. The high pressure reinforced hose assembly of claim 8, wherein the number of flutes and lands or the size of the flutes and lands of the first set is different from the number of flutes and lands or the size of the flutes and lands of the second set.

16. The high pressure reinforced hose assembly of claim 8, wherein the number of flutes and lands or the size of the flutes and lands of the third set is different from at least one of the first and second sets.

17. The high pressure reinforced hose assembly of claim 8, wherein the number of flutes and lands or the size of the flutes and lands of the third set is different from the number of flutes and lands or the size of the flutes and lands of the fourth set.

18. The high pressure reinforced hose assembly of claim 8, wherein ends of the first set of at least three flutes and lands are defined by the reinforcement liner stop and the innermost liner.

19. A high pressure reinforced hose assembly, comprising:
an end connector having a coupler end and a hose receiver end, comprising:
a ferrule attached to a stem at an attachment point adjacent the coupler end, the stem and ferrule having a cavity located therebetween, extending along a length of the end connector, configured to receive an end of a reinforced hose therein, and divided into: at least two gripping zones extending from adjacent a point where the ferrule is attached to the stem toward the hose receiver end, the at least two gripping zones including:

a first gripping zone located adjacent the attachment point where the ferrule is attached to the stem and having a first set of at least three flutes and lands formed in the stem, and a second set of at least three flutes and lands formed in the ferrule, wherein an axial distance between each of the flutes of the first set in the stem is different from an axial distance between each of the flutes of the second set in the ferrule, as taken along a longitudinal central axis of the end connector, wherein the first gripping zone further includes a reinforcement liner stop formed in the stem and located nearer the coupler end than the first set of at least three flutes and lands; and a second gripping zone located nearer the hose receiver end than the first gripping zone and having a third set of at least three flutes and lands formed in the stem, wherein an axial distance between each of the flutes of the third set in the stem is different from the axial distances between each of the flutes of the first set and each of the flutes of the second set, as taken along the central axis, and having a fourth set of at least three flutes and lands formed in the ferrule, wherein an axial distance between each of the flutes of the fourth set in the ferrule is different from the axial distance between each of the flutes of the second set in the ferrule, as taken along the central axis; and a section of high pressure reinforced hose having first and second ends, an innermost liner, and one or more reinforcement layers located over the innermost liner, the first end being received within the cavity, wherein ends of the first set of at least three flutes and lands are defined by the reinforcement liner stop and the innermost liner.

\* \* \* \* \*